(12) United States Patent
Yazawa et al.

(10) Patent No.: US 10,276,305 B2
(45) Date of Patent: Apr. 30, 2019

(54) CERAMIC ELECTRONIC DEVICE

(71) Applicant: TDK CORPORATION, Tokyo (JP)

(72) Inventors: Kosuke Yazawa, Tokyo (JP); Norihisa Ando, Tokyo (JP); Masahiro Mori, Tokyo (JP); Sunao Masuda, Tokyo (JP); Kayou Matsunaga, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/854,523

(22) Filed: Dec. 26, 2017

(65) Prior Publication Data

US 2018/0182553 A1 Jun. 28, 2018

(30) Foreign Application Priority Data

Dec. 28, 2016 (JP) ................. 2016-255515

(51) Int. Cl.
*H01G 4/224* (2006.01)
*H01G 4/248* (2006.01)
*H01G 4/12* (2006.01)
*H01G 4/30* (2006.01)
*H01G 4/38* (2006.01)
*H01G 4/232* (2006.01)

(52) U.S. Cl.
CPC .............. *H01G 4/248* (2013.01); *H01G 4/12* (2013.01); *H01G 4/224* (2013.01); *H01G 4/232* (2013.01); *H01G 4/30* (2013.01); *H01G 4/38* (2013.01); *H01G 4/1227* (2013.01); *H01G 4/2325* (2013.01)

(58) Field of Classification Search
CPC .......... H01G 4/248; H01G 4/224; H01G 4/12
USPC ................ 361/321.1, 306.1, 309, 308.1, 310
See application file for complete search history.

(56) References Cited

U.S. PATENT DOCUMENTS

| | | | |
|---|---|---|---|
| 2003/0011959 A1* | 1/2003 | Moriwaki | ............... H01G 4/228 361/308.1 |
| 2003/0189817 A1* | 10/2003 | Yoshii | .................... H01C 1/144 361/773 |

FOREIGN PATENT DOCUMENTS

JP 2000-228327 A 8/2000

* cited by examiner

*Primary Examiner* — Eric W Thomas
*Assistant Examiner* — Arun Ramaswamy
(74) *Attorney, Agent, or Firm* — Oliff PLC

(57) ABSTRACT

A ceramic electronic device includes a chip component, a pair of metal terminal portions, and a case. The metal terminal portion includes a terminal connection portion and a mount portion. The terminal connection portion faces a chip end surface and is connected with a terminal electrode. The mount portion is electrically connected with the terminal connection portion, extends toward a center substantially vertically to the chip end surface, and faces the chip component with a predetermined space. The case has a pair of case end walls sandwiching the pair of metal terminal portions from both sides and holding the chip component between the pair of metal terminal portions.

6 Claims, 9 Drawing Sheets

CERAMIC ELECTRONIC DEVICE

BACKGROUND OF THE INVENTION

1. Field of the Invention

The present invention relates to a ceramic electronic device having a chip component and a metal terminal attached thereto.

2. Description of the Related Art

In addition to a normal chip component that is solely directly mounted on a board or so, a chip component attached with a metal terminal is proposed as a ceramic electronic device, such as a ceramic capacitor. It is reported that the ceramic electronic device attached with a metal terminal after being mounted has a reduction effect on a deformation stress that travels from a board to a chip component and a protection effect on a chip component from impacts or so. Thus, the ceramic electronic device attached with a metal terminal is used in a field where durability, reliability, and the like are required.

The ceramic electronic device attached with a metal terminal is also proposed to be covered with a mold resin, a case material, or the like.

Patent Document 1: JP 2000-228327 A

SUMMARY OF THE INVENTION

In a metal terminal used for conventional ceramic electronic devices, however, a mount portion connected with a mount board is bent outward with respect to a chip component, and the ceramic electronic device has a comparatively large projected area (a projected area in the Z-axis direction), compared to a projected area of the chip component. In a conventional ceramic electronic device where a chip component and a metal terminal are joined using a conductive joint member, such as a solder, a vibration of the chip component easily travels to the metal terminal.

The present invention has been achieved under such circumstances. It is an object of the invention to provide a ceramic electronic device capable of preventing increase in mount area while preventing a vibration generated in a chip component from traveling to a mount board via a metal terminal.

To achieve the above object, the ceramic electronic device according to the present invention is a ceramic electronic device comprising:

a chip component where terminal electrodes are formed on a pair of chip end surfaces;

a pair of metal terminal portions arranged correspondingly with the pair of chip end surfaces; and a case composed of an insulator and housing at least a part of the chip component and the metal terminal portions, wherein the metal terminal portion comprises:

a terminal connection portion facing the chip end surface and connected with the terminal electrode; and a mount portion electrically connected with the terminal connection portion, extending toward a center substantially vertically to the chip end surface, and facing the chip component with a predetermined space, the case comprises:

a pair of case end walls facing the chip end surface across the terminal connection portion; and a pair of case side walls connecting the pair of case end walls and facing each other across the chip component, and the pair of case end walls sandwiches the pair of metal terminal portions from both sides and holds the chip component between the pair of metal terminal portions.

In the metal terminal portion of the ceramic electronic device according to the present invention, the mount portion extends toward the center of the ceramic electronic device substantially vertically to the chip end surface, and the ceramic electronic device according to the present invention can thereby have a small mount area, compared to a conventional ceramic electronic device where a mount portion is bent outward with respect to a chip component. In the ceramic electronic device, the pair of case end walls sandwiches a pair of the metal terminal portions and holds the chip component between the metal terminal portions, and a contact state between the terminal connection portion and the chip end surface can be thereby maintained by elastic forces of the case and the metal terminal portions even without a conductive connection material, such as a solder. In the ceramic electronic device, a vibration is hard to travel from the chip component to the metal terminal portions, and an acoustic noise can be prevented from occurring, compared to the conventional electronic device. A vibration absorption effect of the case can reduce a vibration transmitted to a mount board and prevent an acoustic noise.

In the ceramic electronic device according to the present invention, a contact state between the terminal connection portion and the chip end surface can be maintained without using a solder or so, and it is thereby possible to prevent a joint release between the metal terminal portion and the chip component due to heat during mounting. Moreover, the ceramic electronic device according to the present invention can reduce an amount of materials with environmental load (such as lead) by avoiding using a high-temperature solder or so.

For example, the terminal connection portion may comprise:

a terminal contact portion in contact with the chip end surface; and an overlapped portion connected with the terminal contact portion via a bending portion and at least partially sandwiched with the terminal contact portion between the chip end surface and the case end wall.

When the terminal connection portion has the overlapped portion, the terminal connection portion can be elastically deformed largely in a direction where the terminal connection portions sandwich the chip component, and a size dispersion of the chip component can be thereby handled flexibly. An electrical connection between the chip component and the metal terminal portion can be securely maintained due to elastic deformation of the metal terminal portions even without using a connection material, such as a solder.

For example, the metal terminal portion may comprise a lower exposed portion extending substantially in parallel to the chip end surface, exposed downward from a lower end of the case end wall, and connecting between the terminal connection portion and the mount portion.

When the metal terminal portion has the lower exposed portion, a solder fillet is formed on the lower exposed portion at the time of mounting the ceramic electronic device on the mount board, and the ceramic electronic device thereby has a favorable mount strength.

For example, the case may comprise a case connection portion connecting the pair of case side walls below the chip component.

When the case has the case connection portion, the chip component is supported from below by the case connection portion and is thereby held more securely by the metal terminal portion.

For example, the ceramic electronic device according to the present invention may comprise:

a plurality of the chip components arranged in a parallel direction to a mount surface; and a plurality of the metal terminal portions corresponding with each of the chip components, wherein the pair of case end walls may sandwich the plurality of the metal terminal portions from both sides and hold the plurality of the chip components between the plurality of the metal terminal portions.

When the ceramic electronic device according to the present invention has the plurality of the chip components, each of the chip components may have a pair of the metal terminal portions. Since the metal terminal portions are independent from each of the chip components, each of the chip components is held by the respective metal terminal portions even if the chip components housed in the case do not completely have the same size.

For example, the case may comprise a cover portion connecting the pair of case side walls above the chip component.

The case with the cover portion can prevent the chip components from protruding upward by an impact or so, and the metal terminal portions can securely hold each of the chip components.

DESCRIPTION OF THE PREFERRED EMBODIMENTS

Hereinafter, an embodiment of the present invention is described based on figures.

Figure 1:
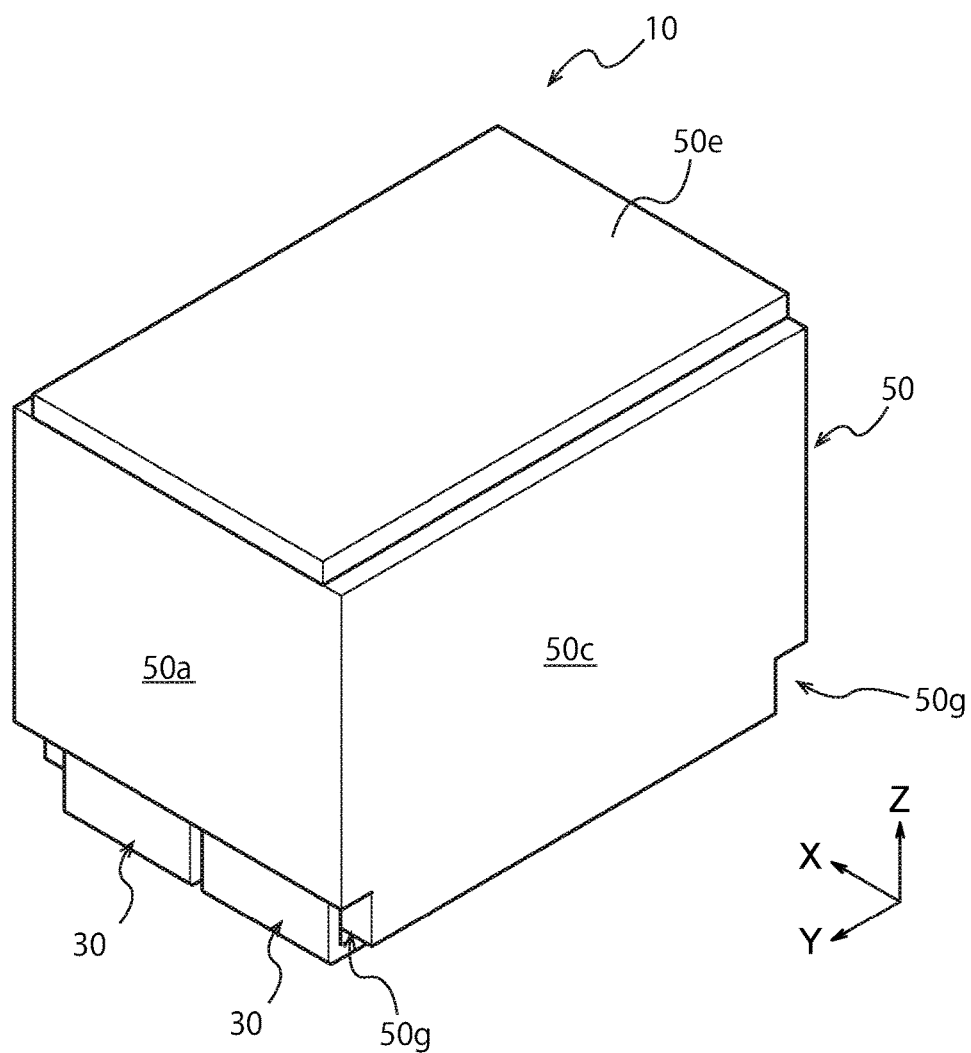
FIG. 1 is a perspective view of a ceramic capacitor according to an embodiment of the present invention.
Figure 2:
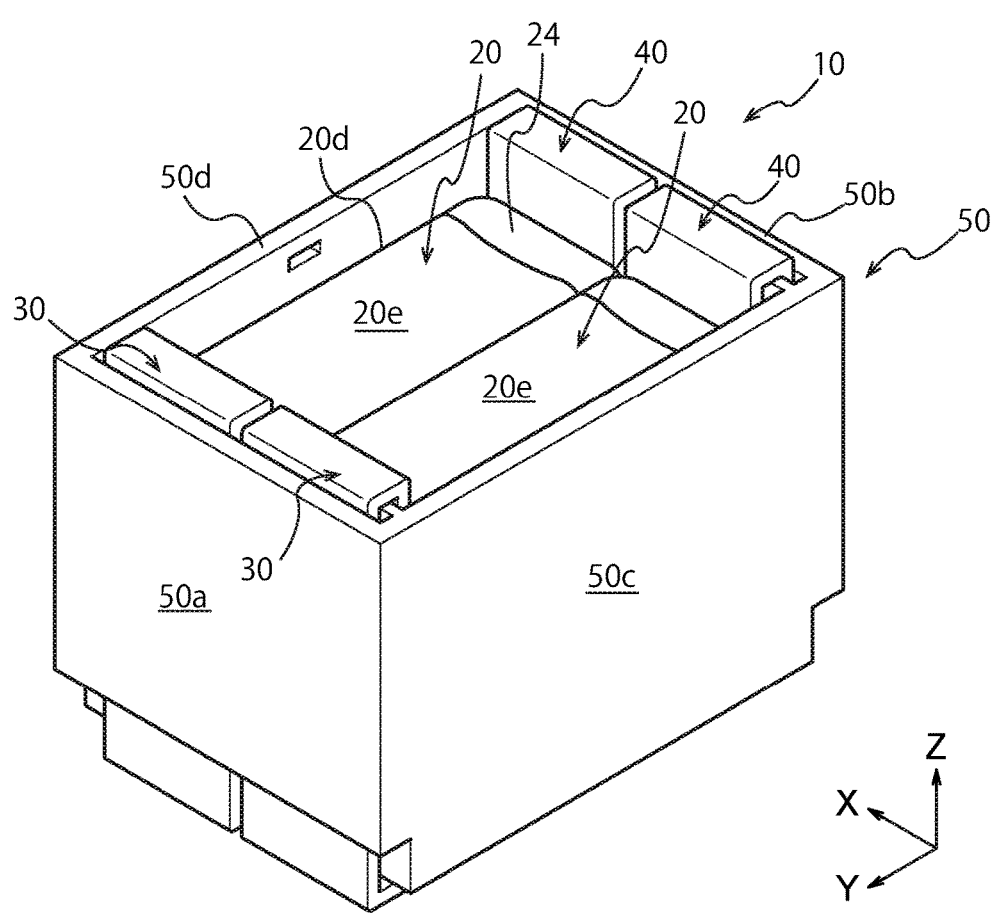
FIG. 2 is a perspective view of the ceramic capacitor shown in FIG. 1 without a cover portion.

FIG. 1 is a schematic perspective view showing a ceramic capacitor 10 according to the embodiment of the present invention. FIG. 2 is a perspective view of the ceramic capacitor 10 without a cover portion 50e of a case 50. As shown in FIG. 1 and FIG. 2, the ceramic capacitor 10 has chip capacitors 20 as two chip components, two pairs of metal terminal portions 30 and 40 in total (a pair of metal terminal portions per each chip capacitor 20), and the case 50. The ceramic capacitor 10 according to the embodiment has two chip capacitors 20, but any number of the chip capacitors 20 may be employed.

Incidentally, the embodiment is described with an example of a ceramic capacitor where the chip capacitors 20 are provided with the metal terminal portions 30 and 40, but the ceramic electronic device of the present invention is not limited to this ceramic capacitor and may include a chip component other than capacitors. In the description of the embodiment, as shown in FIG. 1 to FIG. 7, the Z-axis direction is a vertical direction to a mount surface of the ceramic capacitor 10, the Y-axis direction is a direction connecting between a chip left end surface 20a, which is one of end surfaces of the chip capacitor 20, and a chip right end surface 20b, which is the other end surface of the chip capacitor 20, and the X-axis direction is a vertical direction to the Z-axis direction and the Y-axis direction (a direction connecting between a chip front side surface 20c and a chip back side surface 20d of the chip capacitor 20).

Figure 7:
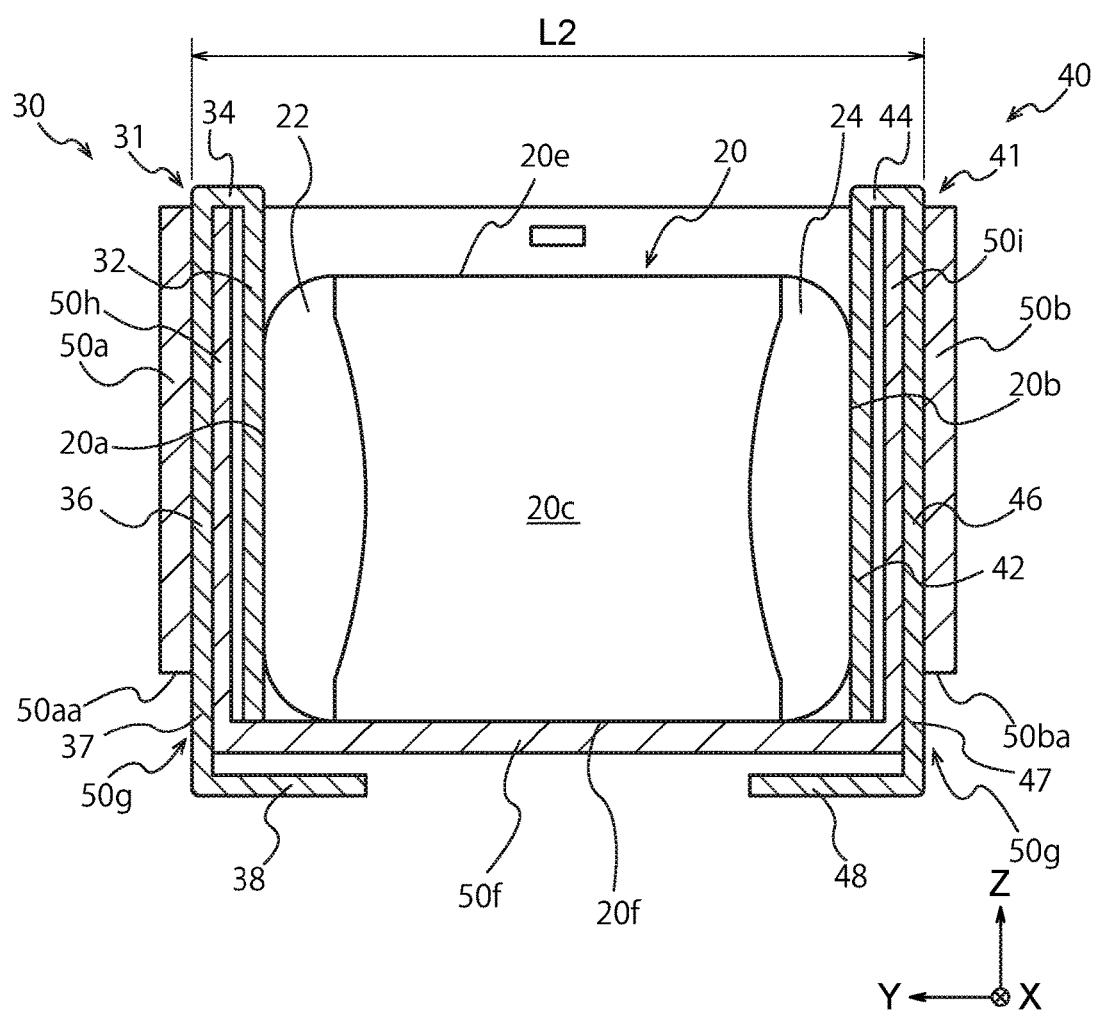
FIG. 7 is a cross sectional view of the ceramic capacitor taken along VII-VII line of FIG. 6.

As shown in FIG. 2 and FIG. 7, which is a cross sectional view, the chip component has an approximately rectangular parallelepiped shape, and the two chip capacitors 20 have shape and size that are approximately identical to each other. The chip capacitor 20 has the chip left end surface 20a and the chip right end surface 20b, which are a pair of chip end surfaces facing each other. The terminal electrode 22 is formed on the chip left end surface 20a. The terminal electrode 24 is formed on the chip right end surface 20b.

In the chip capacitor 20, the chip left end surface 20a and the chip right end surface 20b are arranged vertically to a mount surface. Incidentally, the mount surface of the ceramic capacitor 10 is a surface facing bottom surfaces of mount portions 38 and 48 of the metal terminal portions 30 and 40 mentioned below, and is a surface attached with the ceramic capacitor 10 by a solder or so. The mount surface is parallel to the XY plane in FIG. 1 to FIG. 7.

Figure 6:
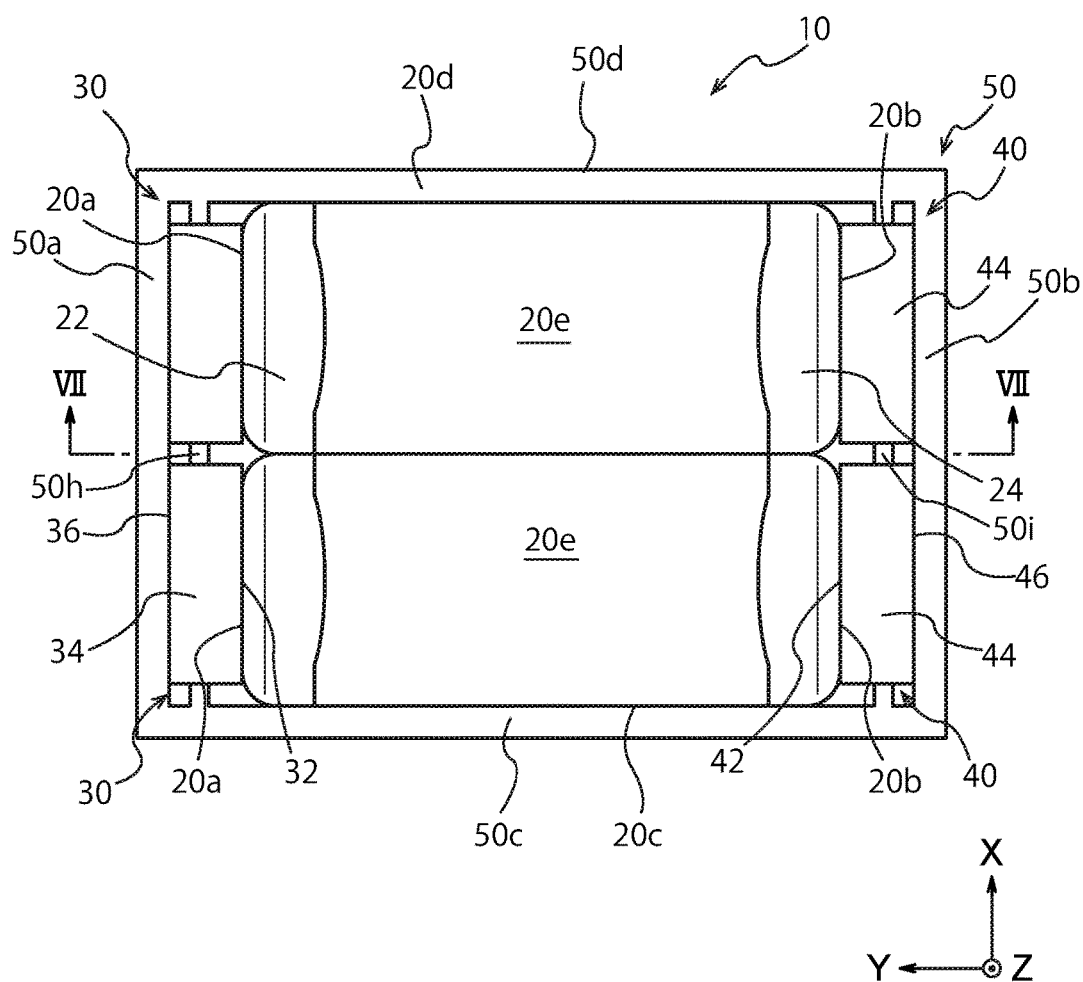
FIG. 6 is a top view of the ceramic capacitor shown in FIG. 2.

As shown in FIG. 6 and FIG. 7, the chip capacitor 20 has four side surfaces connecting between the chip left end surface 20a and the chip right end surface 20b, and the four side surfaces of the chip capacitor 20 consist of a chip front side surface 20c facing forward (the negative side in the X-axis direction), a chip back side surface 20d facing backward (the positive side in the X-axis direction), a chip top side surface 20e facing upward, and a chip bottom side surface 20f facing downward.

As shown in FIG. 6 and FIG. 7, the terminal electrode 22 of the chip capacitor 20 is formed to cover the chip left end surface 20a and a part of the side surfaces 20c to 20f. Thus, the terminal electrode 22 has a part arranged on the chip left end surface 20a and a part arranged on the chip front side surface 20c to the chip bottom side surface 20f.

The terminal electrode 24 of the chip capacitor 20 is formed to cover the chip right end surface 20b and another part of the side surfaces 20c to 20f (a different part from the part covered with the terminal electrode 22). Thus, the terminal electrode 24 has a part arranged on the chip right end surface 20b and a part arranged on the chip front side surface 20c to the chip bottom side surface 20f. The terminal electrode 22, which is one of the terminal electrodes of the chip capacitor 20, and the terminal electrode 24, which is the other terminal electrode of the chip capacitor 20, are formed with a predetermined distance on the chip front side surface 20c to the chip bottom side surface 20f.

The chip capacitor 20 has any internal structure, and is a multilayer capacitor where internal electrode layers and dielectric layers are laminated, for example. The internal electrode layers consist of internal electrode layers connected with the terminal electrode 22 and internal electrode layers connected with the terminal electrode 24. In the chip capacitor 20, the internal electrode layers connected with the terminal electrode 22 and the internal electrode layers connected with the terminal electrode 24 are laminated alternately by sandwiching the dielectric layers.

The chip capacitor 20 has a lamination direction that is vertical to the Y-axis direction, which connects between the chip left end surface 20a with the terminal electrode 22 and the chip right end surface 20b with the terminal electrode 24. In the chip capacitor 20, the lamination direction is the Z-axis direction. The chip capacitor 20, however, may have a lamination direction of the X-axis direction.

The dielectric layers of the chip capacitors 20 are composed of any dielectric material, such as calcium titanate, strontium titanate, barium titanate, and a mixture thereof. Each of the dielectric layers has any thickness, but normally has a thickness of several μm to several hundred μm. In the present embodiment, each of the dielectric layers preferably has a thickness of 1.0 to 5.0 μm. The dielectric layers preferably have a main component of barium titanate, which can increase capacitance of capacitors.

The internal electrode layers contain any conductive material, but may contain a comparatively inexpensive base metal when the dielectric layers are composed of a reduction resistant material. The base metal is preferably Ni or a Ni alloy. The Ni alloy is preferably an alloy of Ni and one or more elements of Mn, Cr, Co, and Al, and preferably contains Ni at 95 wt % or more. Incidentally, Ni or the Ni alloy may contain various fine components, such as P, at about 0.1 wt % or less. The internal electrode layers may be formed using a commercially available electrode paste. Each of the internal electrode layers has a thickness appropriately determined based on usage or so.

The terminal electrodes 22 and 24 are also composed of any material. The terminal electrodes 22 and 24 are normally composed of copper, copper alloy, nickel, nickel alloy, or the like, but may be composed of silver, an alloy of silver and palladium, or the like. Each of the terminal electrodes 22 and 24 also has any thickness, but normally has a thickness of about 10 to 50 μm. Incidentally, at least one metal film of Ni, Cu, Sn, etc. may be formed on the surfaces of the terminal electrodes 22 and 24.

The chip capacitors 20 have shape and size that are appropriately determined based on object and usage. For example, the chip capacitor 20 has a length (Y-axis direction) of 1.0 to 6.5 mm, preferably 3.2 to 5.9 mm, a width (Z-axis direction) of 0.5 to 5.5 mm, preferably 1.6 to 5.2 mm, and a thickness (X-axis direction) of 0.3 to 3.2 mm, preferably 0.8 to 2.9 mm. When the ceramic capacitor 10 has a plurality of the chip capacitors 20, the chip capacitors 20 may have mutually different size and shape.

As shown in FIG. 7, a pair of the metal terminal portions 30 and 40 of the ceramic capacitor 10 is arranged correspondingly with the chip left and right end surfaces 20a and 20b, which is a pair of chip end surfaces. The metal terminal portion 30 corresponds with the chip left end surface 20a and is electrically connected with the terminal electrode 22 formed on the chip left end surface 20a. The metal terminal portion 40 corresponds with the chip right end surface 20b and is electrically connected with the terminal electrode 24 formed on the chip right end surface 20b.

Since the ceramic capacitor 10 has two chip capacitors 20 as shown in FIG. 2, each of the two chip capacitors 20 has one metal terminal portion 30 and one metal terminal portion 40 (the two chip capacitors 20 have two metal terminal portions 30 and two metal terminal portions 40 in total). Each of the two metal terminal portions 30 has a similar shape, but when each of the chip capacitors 20 of the ceramic capacitor 10 has a mutually different shape, the metal terminal portions 30 may have a mutually different shape based on their corresponding chip capacitors 20.

Figure 8:
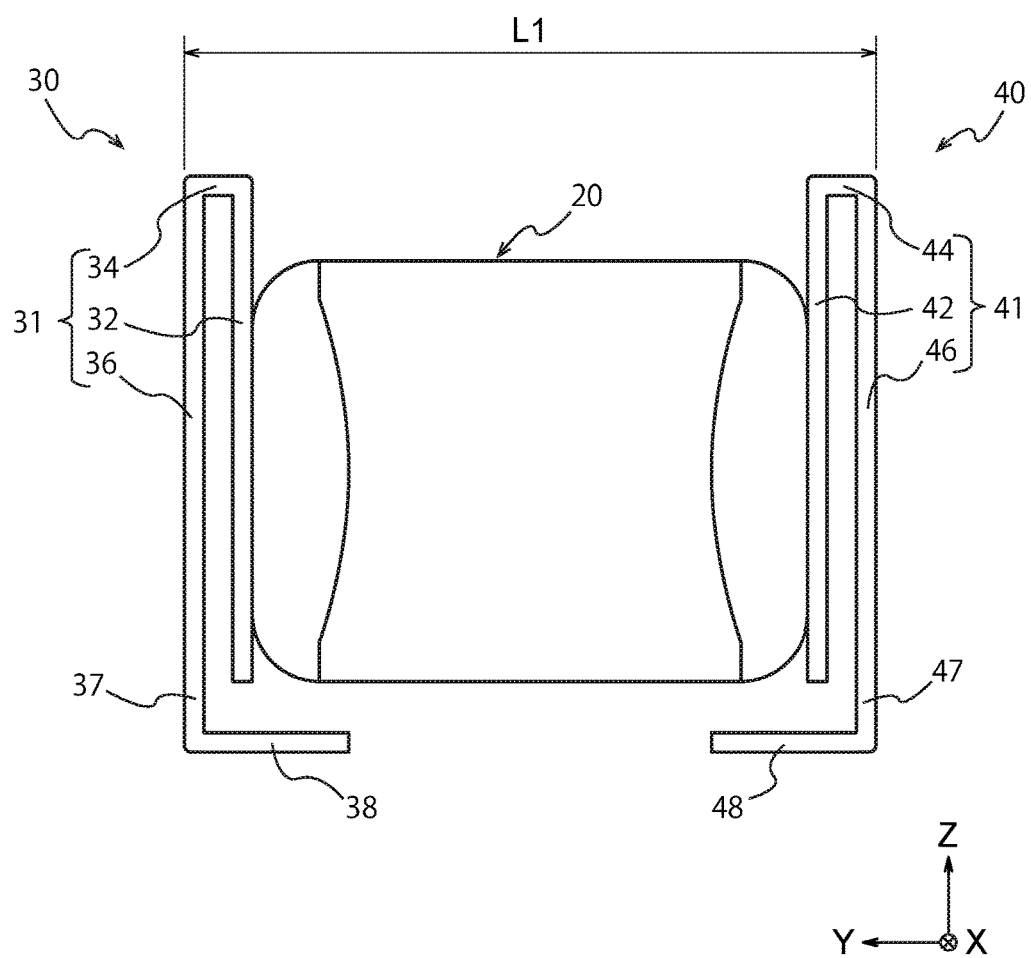
FIG. 8 is a front view showing a chip capacitor and metal terminal portions before being housed in a case.

As shown in FIG. 8, the metal terminal portion 30 has a terminal connection portion 31, a lower exposed portion 37, and a mount portion 38. The terminal connection portion 31 has a terminal contact portion 32, a bending portion 34, and an overlapped portion 36. As shown in FIG. 7, when viewed from the negative side of the X-axis direction, the metal terminal portion 30 is bent at 180 degrees at the bending portion 34 and at 90 degrees at a connection portion between the lower exposed portion 37 and the mount portion 38 from a starting point of the terminal contact portion 32 to the mount portion 38 in the same rotation direction (counter-clockwise).

The terminal connection portion 31 of the metal terminal portion 30 faces the chip left end surface 20a and is connected with the terminal electrode 22 formed on the chip left end surface 20a. The terminal contact portion 32 positioned inside of the terminal connection portion 31 is in contact with the chip left end surface 20a. The terminal contact portion 32 has a flat shape that is approximately parallel the chip left end surface 20a. As described below, the terminal connection portion 31 is energized toward the chip left end surface 20a by elastic forces of the metal terminal portion 30 and the case 50, and the terminal contact portion 32 is pushed against the terminal electrode 22.

The overlapped portion 36 is connected with the terminal contact portion 32 via the bending portion 34. The overlapped portion 36 faces a case left end wall 50a of the case 50 and is in contact with the case left end wall 50a. As shown in FIG. 7, the metal terminal portion 30 is bent at 180 degrees at the bending portion 34, and the overlapped portion 36 thereby has a flat shape that is approximately parallel to the chip left end surface 20a in a similar manner to the terminal contact portion 32. The overlapped portion 36 and the terminal contact portion 32 face each other with a predetermined distance.

At least a part of the overlapped portion 36 (approximately entire overlapped portion 36 in the present embodiment) is sandwiched with the terminal contact portion 32 between the chip left end surface 20a and the case left end wall 50a. An elastic force (restoring force) for increasing the distance between the terminal contact portion 32 and the overlapped portion 36 is generated in the metal terminal portion 30, but both sides of the terminal contact portion 32 and the overlapped portion 36 are sandwiched by the case left end wall 50a and the chip left end surface 20a. Thus, a contact state between the terminal contact portion 32 and the terminal electrode 22 is maintained by the elastic force of the metal terminal portion 30.

In the terminal connection portion 31 according to the present embodiment, the terminal contact portion 32 and the overlapped portion 36 sandwich a case inner wall 50h of the case 50 as shown in FIG. 7, but the case inner wall 50h is described below.

As shown in FIG. 7, the metal terminal portion 30 extends approximately in parallel to the chip left end surface 20a and has the lower exposed portion 37 exposed downward from a lower end 50aa of the case left end wall 50a. The lower exposed portion 37 has an upper end connected with the overlapped portion 36 and a lower end connected with the mount portion 38. The lower exposed portion 37 is arranged on the same plane as the overlapped portion 36. A direction where the lower exposed portion 37 extends (parallel to the XZ plane) is vertical to a direction where the mount portion 38 extends (parallel to the XY plane).

The mount portion 38 is connected with the lower end of the lower exposed portion 37 and extends approximately vertically to the chip left end surface 20a. The mount portion 38 extends from a connection portion with the lower exposed portion 37 toward the center of the ceramic capacitor 10 and faces the chip capacitor 20 with a predetermined space. As shown in FIG. 7, a case connection portion 50f of the case 50 is arranged between the chip bottom side surface 20f of the chip capacitor 20 and the mount portion 38.

The mount portion 38 is electrically connected with the terminal contact portion 32 via the lower exposed portion 37, the overlapped portion 36, and the bending portion 34. Thus, when the mount portion 38 is mounted on a mount board using a solder or so, a conduction between the chip capacitor 20 and the mount board is secured.

Figure 3:
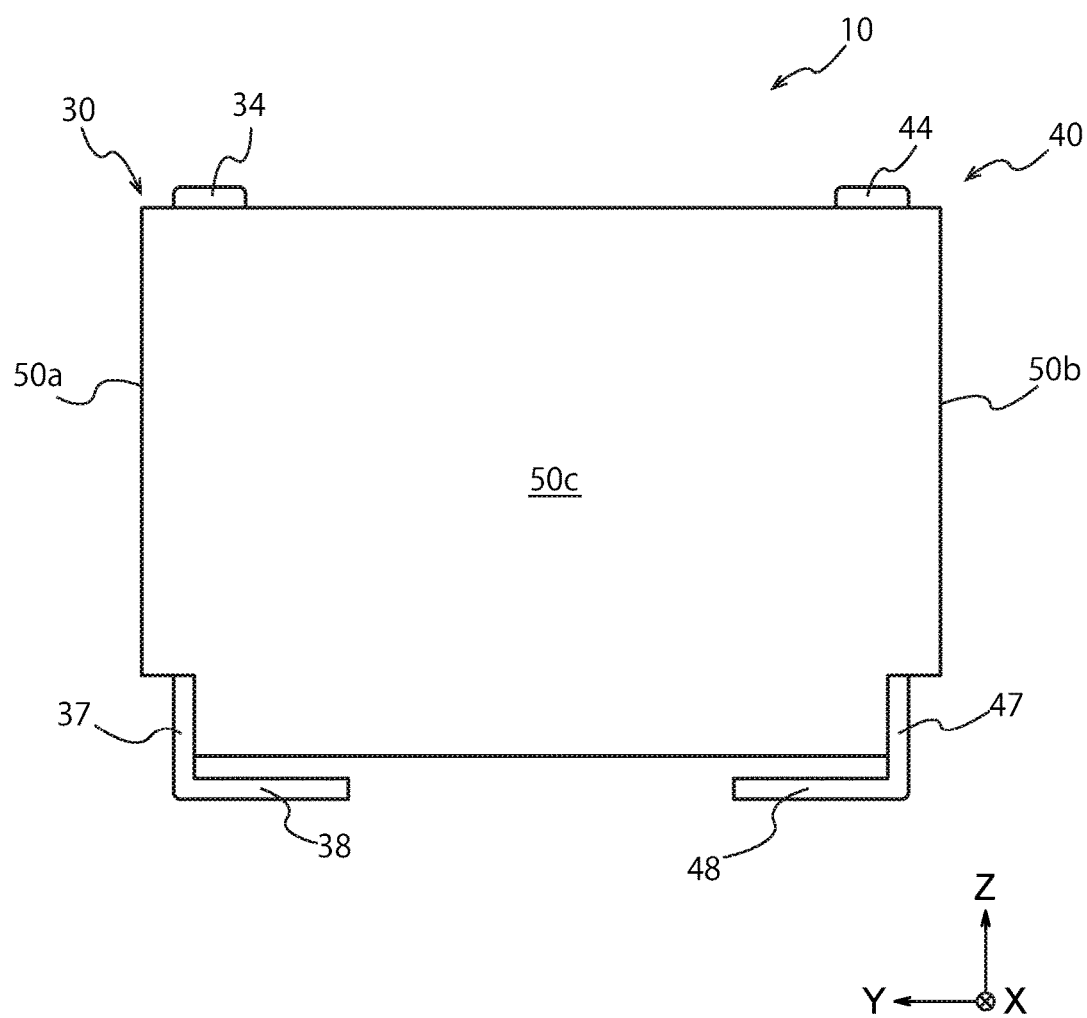
FIG. 3 is a front view of the ceramic capacitor shown in FIG. 2.
Figure 5:
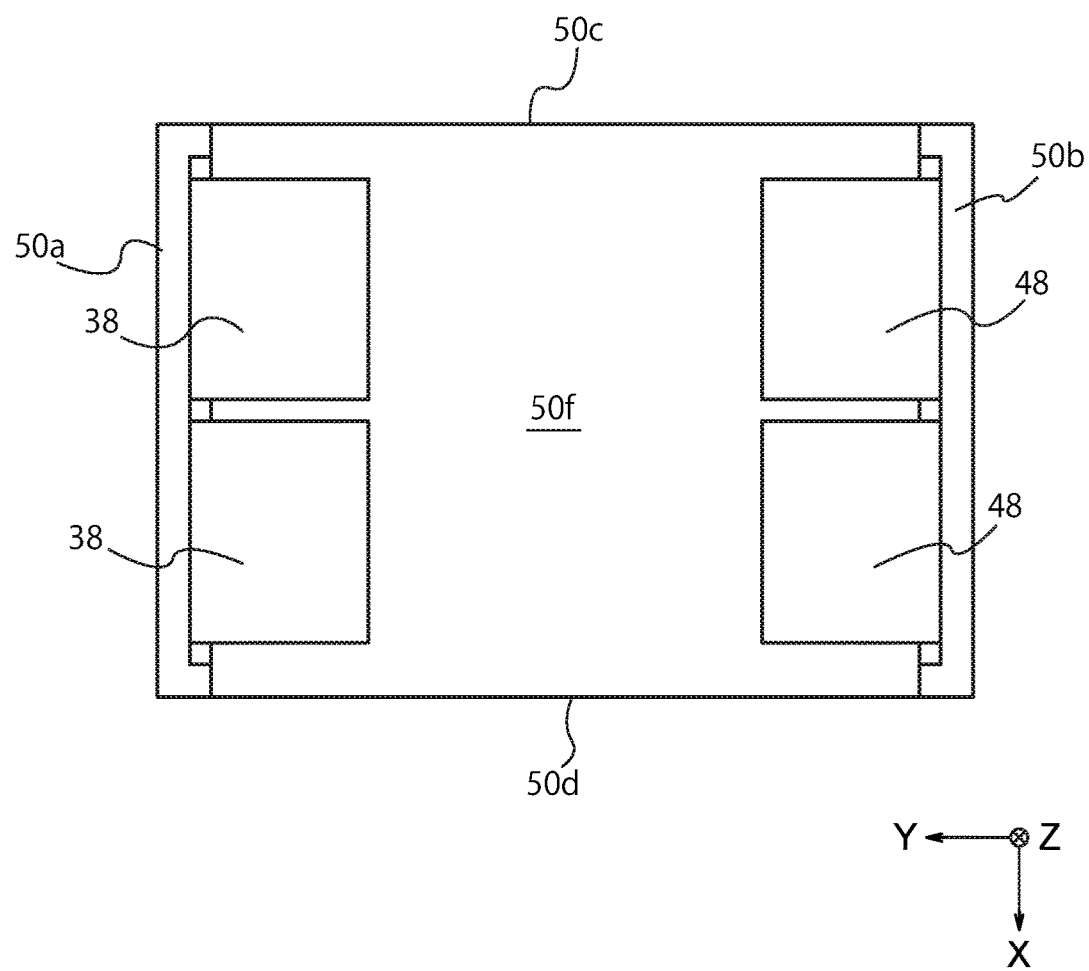
FIG. 5 is a bottom view of the ceramic capacitor shown in FIG. 2.

As shown in FIG. 3 and FIG. 5, the mount portion 38 and the lower exposed portion 37 of the metal terminal portion 30 are exposed outward from the case 50, and the case 50 covers the terminal connection portion 31 having the terminal contact portion 32, the bending portion 34, and the overlapped portion 36.

As shown in FIG. 8, the metal terminal portion 40 has a terminal connection portion 41, a lower exposed portion 47, and a mount portion 48. The terminal connection portion 41 has a terminal contact portion 42, a bending portion 44, and an overlapped portion 46. As shown in FIG. 7, when viewed from the negative side of the X-axis direction, the metal terminal portion 40 is bent at 180 degrees at the bending portion 44 and at 90 degrees at a connection portion between the lower exposed portion 47 and the mount portion 48 from a starting point of the terminal contact portion 42 to the mount portion 48 in the same rotation direction (clockwise).

The metal terminal portion 40 is arranged symmetrically to the metal terminal portion 30, but has the same shape as the metal terminal portion 30. The terminal connection portion 41 of the metal terminal portion 40 faces the chip right end surface 20b and is connected with the terminal electrode 24 formed on the chip right end surface 20b. The terminal contact portion 42 positioned inside of the terminal connection portion 41 has a flat shape that is approximately parallel to the chip right end surface 20b. The terminal contact portion 42 is energized toward the chip right end surface 20b by elastic forces of the metal terminal portion 40 and the case 50, and is pushed against the terminal electrode 24.

The overlapped portion 46 is connected with the terminal contact portion 42 via the bending portion 44. The overlapped portion 46 faces a case right end wall 50b of the case 50 and is in contact with the case right end wall 50b. As shown in FIG. 7, the overlapped portion 46 has a flat shape that is approximately parallel to the chip right end surface 20b in a similar manner to the terminal contact portion 42, and the overlapped portion 46 and the terminal contact portion 42 face each other with a predetermined distance.

At least a part of the overlapped portion 46 (approximately entire overlapped portion 46 in the present embodiment) is sandwiched with the terminal contact portion 42 between the chip right end surface 20b and the case right end wall 50b. An elastic force (restoring force) for increasing the distance between the terminal contact portion 42 and the overlapped portion 46 is generated in the metal terminal portion 40, but the terminal contact portion 42 and the overlapped portion 46 are sandwiched by the case right end wall 50b and the chip right end surface 20b. Thus, a contact state between the terminal contact portion 42 and the terminal electrode 24 is maintained by the elastic force of the metal terminal portion 40.

In the terminal connection portion 41 according to the present embodiment, the terminal contact portion 42 and the overlapped portion 46 sandwich a case inner wall 50i of the case 50 as shown in FIG. 7, but the case inner wall 50i is described below.

As shown in FIG. 7, the metal terminal portion 40 extends approximately in parallel to the chip right end surface 20b and has the lower exposed portion 47 exposed downward from a lower end 50ba of the case right end wall 50b. The lower exposed portion 47 has an upper end connected with the overlapped portion 46 and a lower end connected with the mount portion 48. The lower exposed portion 47 is arranged on the same plane as the overlapped portion 46. A direction where the lower exposed portion 47 extends (parallel to the XZ plane) is vertical to a direction where the mount portion 48 extends (parallel to the XY plane).

The mount portion 48 is connected with the lower end of the lower exposed portion 47 and extends approximately vertically to the chip right end surface 20b. The mount portion 48 extends from a connection portion with the lower exposed portion 47 toward the center of the ceramic capacitor 10 and faces the chip capacitor 20 with a predetermined space. As shown in FIG. 7, a case connection portion 50f of the case 50 is arranged between the chip bottom side surface 20f of the chip capacitor 20 and the mount portion 48.

The mount portion 48 is electrically connected with the terminal contact portion 42 via the lower exposed portion 47, the overlapped portion 46, and the bending portion 44. Thus, when the mount portion 48 is mounted on a mount board using a solder or so, a conduction between the chip capacitor 20 and the mount board is secured.

As shown in FIG. 3 and FIG. 5, the whole of the mount portion 48 and the lower exposed portion 47 of the metal terminal portion 40 is exposed outward from the case 50, and the case 50 covers the terminal connection portion 41 having the terminal contact portion 42, the bending portion 44, and the overlapped portion 46.

The metal terminal portions 30 and 40 are composed of any conductive metal material, such as iron, nickel, copper, silver, and an alloy containing these.

As shown in FIG. 1, the case 50 houses the whole of the chip capacitors 20 and a part of the metal terminal portions 30 and 40. The case 50 has an approximately rectangular parallelepiped box outer shape, and is provided with openings 50g, where the metal terminal portions 30 and 40 pass, below on both sides in the Y-axis direction.

As shown in FIG. 7, the case 50 has the case left end wall 50a and the case right end wall 50b, which constitute a pair of case end walls. The case left end wall 50a faces the chip left end surface 20a while the case left end wall 50a and the chip left end surface 20a sandwich the terminal contact portion 32 and the overlapped portion 36 of the metal terminal portion 30. The case right end wall 50b faces the chip right end surface 20b while the case right end wall 50b and the chip right end surface 20b sandwich the terminal contact portion 42 and the overlapped portion 46 of the metal terminal portion 40. The case left end wall 50a is parallel to the chip left end surface 20a, and the case right end wall 50b is parallel to the chip right end surface 20b.

As shown in FIG. 6, the case 50 has a case front side wall 50c and a case back side wall 50d constituting a pair of case side walls. The case front side wall 50c and the case back side wall 50d connect both ends of the case left end wall 50a and the case right end wall 50b, which are a pair of case end walls. The case front side wall 50c and the case back side wall 50d are parallel to the chip front and back side surfaces 20c and 20d and face each other across the two chip capacitors 20.

As shown in FIG. 7, the case left end wall 50a and the case right end wall 50b, which are a pair of the case end walls, sandwich the metal terminal portions 30 and 40, which are a pair of the metal terminal portions, from both sides in the Y-axis direction, and the chip capacitors 20 can be held between the metal terminal portions 30 and 40. That is, as shown in FIG. 6, the case 50 has a frame shape where the case left end wall 50a, the case back side wall 50d, the case right end wall 50b, and the case front side wall 50c are connected when viewed in the Z-axis direction, and a distance between the case left end wall 50a and the case right end wall 50b is approximately constant except for a slight change due to elastic deformation of a resin constituting the case 50.

As shown in FIG. 8, the metal terminal portions 30 and 40 and the chip capacitor 20 are designed so that a total length L1 in the Y-axis direction before being housed in the case 50 is slightly longer than a distance L2 between the case left end wall 50a and the case right end wall 50b shown in FIG. 7. As shown in FIG. 7, the metal terminal portions 30 and 40 and the chip capacitor 20 sandwiched by the case left end wall 50a and the case right end wall 50b thereby receive a force going from the case left end wall 50a and the case right end wall 50b on both sides in the Y-axis direction toward the center. Thus, the chip capacitor 20 is sandwiched and held by the terminal connection portion 31 of the metal terminal portion 30 and the terminal connection portion 41 of the metal terminal portion 40.

In particular, since the metal terminal portions 30 and 40 shown in FIG. 7 have the overlapped portions 36 and 46, elastic forces generated in the terminal contact portions 32 and 42, the bending portions 34 and 44, and the overlapped portions 36 and 46 go toward the center due to the case left end wall 50a and the case right end wall 50b, and the chip capacitor 20 can be securely held between the terminal connection portion 31 and the terminal connection portion 41. In addition, the terminal contact portions 32 and 42 are pushed against the terminal electrodes 22 and 24 by the elastic force generated in the metal terminal portions 30 and 40, and a contact state between the terminal contact portions 32 and 42 and the terminal electrodes 22 and 24 is maintained.

As shown in FIG. 2 and FIG. 6, the two chip capacitors 20 contained in the ceramic capacitor 10 are arranged in parallel to a mount surface (XY plane) along a parallel direction (X-axis direction) to a pair of the case end walls. Moreover, the two pairs of the metal terminal portions 30 and 40 corresponding with the two chip capacitors 20 are arranged inside the case 50 along the case left end wall 50a or the case right end wall 50b and the mount surface (XY plane). Thus, as shown in FIG. 7, both of the chip capacitors 20 are also sandwiched and held by the terminal connection portion 31 of the metal terminal portion 30 and the terminal connection portion 41 of the metal terminal portion 40.

Figure 4:
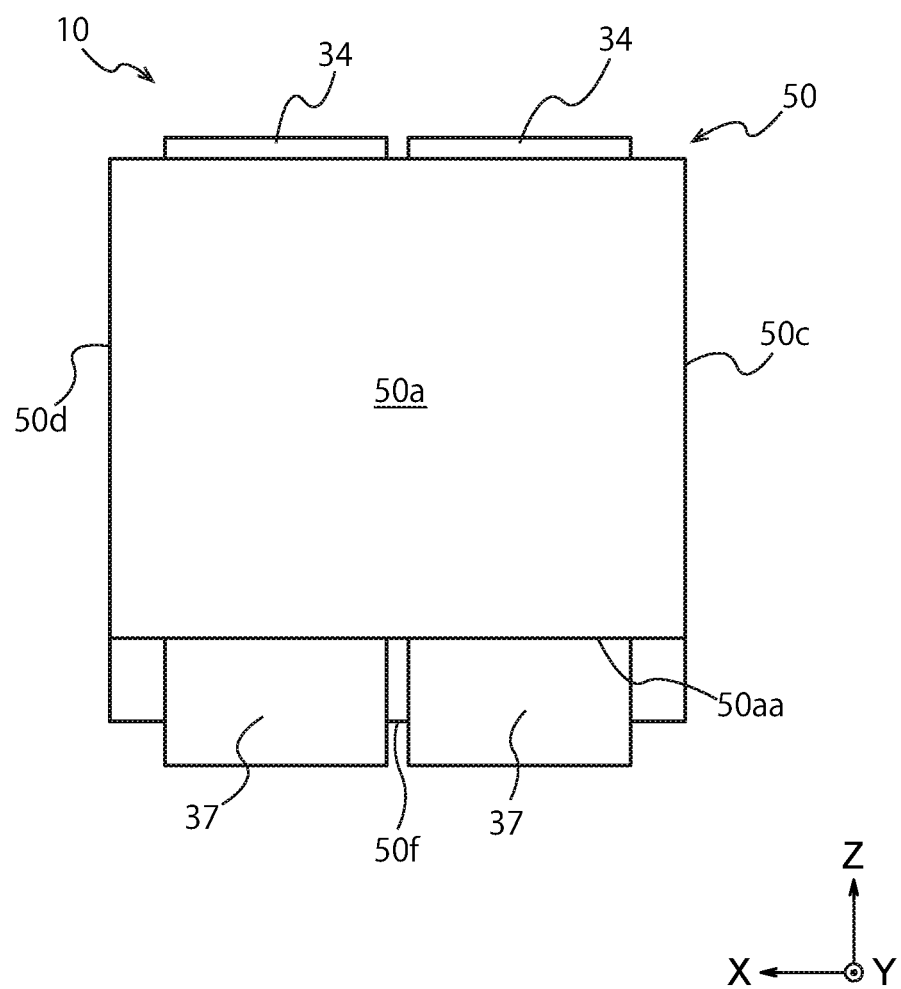
FIG. 4 is a left side view of the ceramic capacitor shown in FIG. 2.

Moreover, as shown in FIG. 7, the case 50 has the case connection portion 50f positioned below the chip capacitors 20 and above the mount portions 38 and 48 of the metal terminal portions 30 and 40. As shown in FIG. 4 and FIG. 5, the case connection portion 50f connects between the case front side wall 50c and the case back side wall 50d, which are a pair of the case side walls, below the chip capacitors 20. As shown in FIG. 7, the case connection portion 50f is not connected with the case left end wall 50a or the case right end wall 50b, but is connected with the case inner walls 50h and 50i on the inner side of the case left end wall 50a and the case right end wall 50b. The lower exposed portion 37 is exposed from the opening 50g between the case left end wall 50a and the case inner wall 50h and the case connection portion 50f. The lower exposed portion 47 is exposed from the opening 50g between the case right end wall 50b and the case inner wall 50i and the case connection portion 50f.

As shown in FIG. 7, the case connection portion 50f of the case 50 is in contact with the chip bottom side surface 20f of the chip capacitor 20 and can support the chip capacitor 20 from below, but a space may be formed between the chip bottom side surface 20f and the case connection portion 50f. In this case, when the ceramic capacitor 10 receives an impact, the case connection portion 50f prevents the chip capacitor 20 from falling off from the metal terminal portions 30 and 40. In addition, the case connection portion 50f covers the chip bottom side surface 20f and can prevent a solder for mounting the ceramic capacitor 10 from covering the chip capacitor 20, the terminal contact portions 32 and 42, and the like.

The case 50 connects between the case front side wall 50c and the case back side wall 50d at the inner side of the case left end wall 50a and has the case inner wall 50h parallel to the case left end wall 50a. The case inner wall 50h is sandwiched by the terminal contact portion 32 and the overlapped portion 36. In other words, the overlapped portion 36 is sandwiched by the case left end wall 50a and the case inner wall 50h. Thus, a vibration of the overlapped portion 36 efficiently travels to the case 50, and the case 50 has a high vibration absorption effect. The terminal contact portion 32 is securely separated from a solder for mounting the ceramic capacitor 10 by the case inner wall 50h and the case connection portion 50f, and the solder for mounting the ceramic capacitor 10 can be prevented from attaching to the terminal contact portion 32.

Likewise, the case 50 connects between the case front side wall 50c and the case back side wall 50d at the inner side of the case right end wall 50b and has the case inner wall 50i parallel to the case right end wall 50b. The case inner wall 50i is sandwiched by the terminal contact portion 42 and the overlapped portion 46. In other words, both sides of the overlapped portion 46 are sandwiched by the case right end wall 50b and the case inner wall 50i. Thus, a vibration of the overlapped portion 46 efficiently travels to the case 50, and the case 50 has a high vibration absorption effect. The terminal contact portion 42 is securely separated from a solder for mounting the ceramic capacitor 10 by the case inner wall 50i and the case connection portion 50f, and the solder for mounting the ceramic capacitor 10 can be prevented from attaching to the terminal contact portion 42.

As shown in FIG. 1, the case 50 has the cover portion 50e covering the top of the chip capacitors 20 (see FIG. 2). The cover portion 50e connects between the case front side wall 50c and the case back side wall 50d (see FIG. 6), which are a pair of the case side walls, at the upper end thereof. Since the cover portion 50e shown in FIG. 1 connects between the case front side wall 50c and the case back side wall 50d above the chip capacitors 20, when the ceramic capacitor 10 receives an impact, the chip capacitors 20 can be prevented from separating from the metal terminal portions 30 and 40 and protruding upward.

Figure 9:
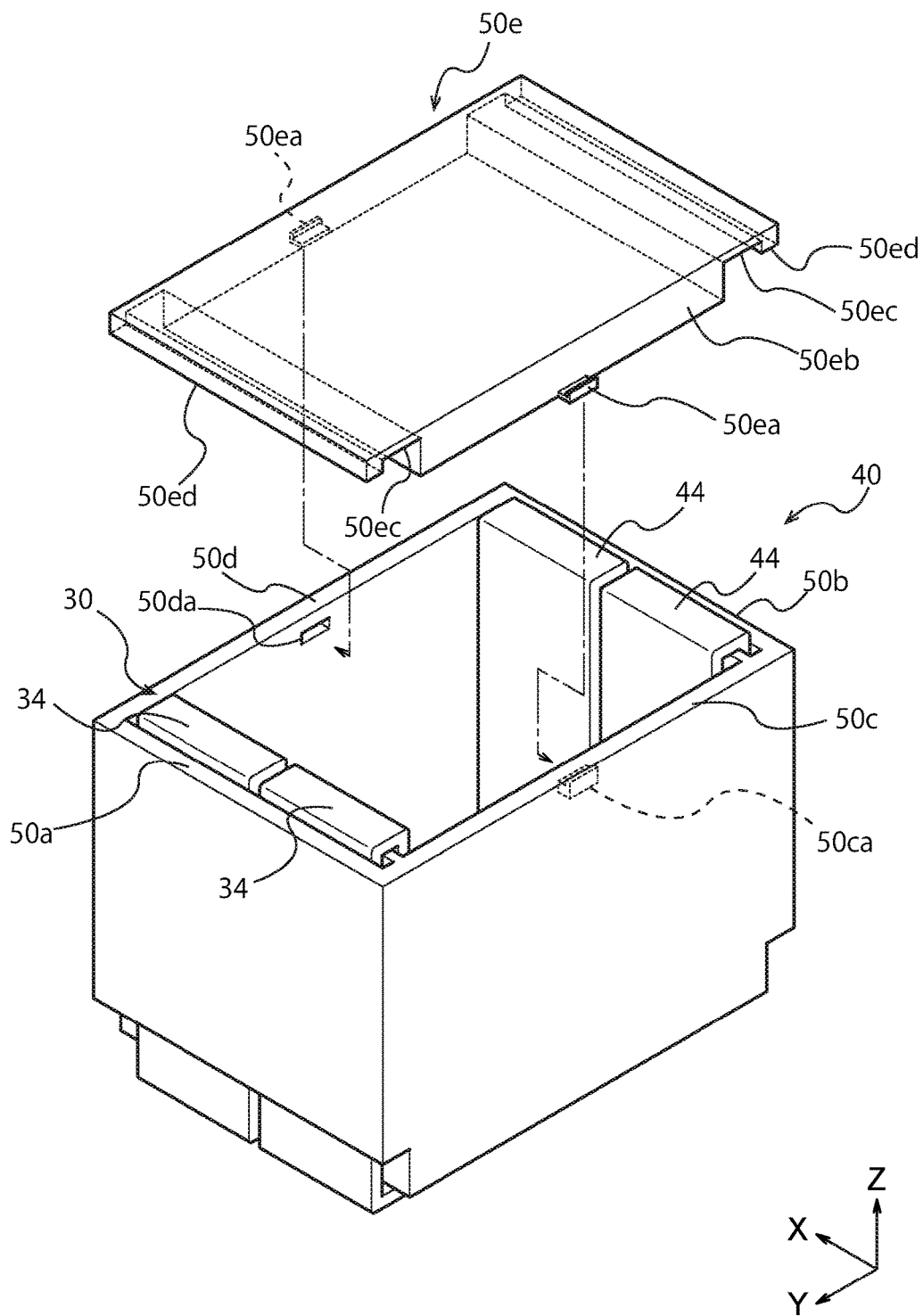
FIG. 9 is a perspective view showing a case, a cover portion contained in the case, and the like of the ceramic capacitor shown in FIG. 1.

As shown in FIG. 9, the cover portion 50e has a middle thick portion 50eb, a pair of thin portions 50ec, and cover end portions 50ed. The middle thick portion 50eb is thick and positioned at the middle of the cover portion 50e in the Y-axis direction. The pair of thin portions 50*ec* is thinner than the middle thick portion 50*eb* and connected with both sides of the middle thick portion 50*eb*. The cover end portions 50*ed* are positioned on both ends of the cover portion 50*e* in the Y-axis direction and connected with the pair of thin portions 50*ec*. The middle thick portion 50*eb* is provided with a pair of engagement protrusions 50*ea* protruding toward the positive side in the X-axis direction and the negative side in the X-axis direction. Each of the engagement protrusions 50*ea* is engaged with engagement grooves 50*ca* and 50*da* arranged on the case front side wall 50*c* and the case back side wall 50*d*. Then, the cover portion 50*e* is fixed.

The middle thick portion 50*eb* of the cover portion 50*e* faces the chip top side surface 20*e* shown in FIG. 6. The bending portions 34 and 44, which are the upper end portions of the metal terminal portions 30 and 40, are housed in the pair of thin portions 50*ec* of the cover portion 50*e*.

The pair of cover end portions 50*ed* of the cover portion 50*e* face the upper end surfaces of the case left end wall 50*a* and the case right end wall 50*b*. The cover portion 50*e* is fixed by any method. In addition to engaging the engagement protrusions 50*ea* with the engagement grooves 50*ca* and 50*da*, the cover portion 50*e* may be fixed by connecting the cover end portions 50*ed* with the top end surfaces of the case left end wall 50*a* and the case right end wall 50*b* using an adhesive or so.

The case 50 according to the embodiment is composed of a resin, but the case 50 may be composed of any insulator. The case 50 can be composed of thermosetting resin, thermoplastic resin, other insulator, or the like.

For example, the ceramic capacitor 10 is manufactured by preparing the chip capacitors 20, the metal terminal portions 30 and 40, and the case 50 and assembling them as below.

In a manufacture of the chip capacitor 20, a laminated body is prepared by laminating green sheets with electrode patterns to be internal electrode layers after being fired, and a capacitor element body is obtained by pressurizing and firing the laminated body. Moreover, the terminal electrodes 22 and 24 are formed on the capacitor element by baking, plating, and the like, and the chip capacitor 20 is obtained.

For example, the metal terminal portions 30 and 40 are manufactured by machining a metal plate. The case 50 is prepared by separately forming the cover portion 50*e* and a portion consisting of the case left end wall 50*a*, the case right end wall 50*b*, the case front side wall 50*c*, the case back side wall 50*d*, and the case connection portion 50*f*.

After the prepared chip capacitors 20 and metal terminal portions 30 and 40 are attached to the case 50 without the cover portion 50*e* (see FIG. 2), the cover portion 50*e* is finally attached to the case 50. Then, the ceramic capacitor 10 is obtained. Incidentally, the mount portions 38 and 48 of the metal terminal portions 30 and 40 are formed by being bent after being attached to the case 50.

Since the mount portions 38 and 48 of the metal terminal portions 30 and 40 extend toward the center of the ceramic capacitor 10, the ceramic capacitor 10 shown in FIG. 1 to FIG. 8 can have a small mount area, compared to a conventional ceramic capacitor where mount portions are bent toward outside the ceramic capacitor. In the ceramic capacitor 10, as shown in FIG. 7, the case left end wall 50*a* and the case right end wall 50*b* sandwich a pair of the metal terminal portions 30 and 40, and the chip capacitors 20 are held between the metal terminal portions 30 and 40. Thus, the ceramic capacitor 10 can maintain a contact state between the terminal contact portions 32 and 42 and the chip left and right end surfaces 20*a* and 20*b* by elastic forces of the case 50 and the metal terminal portions 30 and 40 even without a conductive connection material, such as a solder. In the ceramic capacitor 10, a vibration is hard to travel from the chip capacitors 20 to the metal terminal portions 30 and 40, and an acoustic noise can be prevented from occurring, compared to a conventional electronic device where a metal terminal portion is joined with a chip capacitor by a solder or so. A vibration absorption effect of the case 50 can reduce a vibration transmitted to a mount board and prevent an acoustic noise. Since the terminal connection portions 31 and 41 of the metal terminal portions 30 and 40 are housed in the case 50, a vibration generated in the chip capacitors 20 travels not only to the metal terminal portions 30 and 40 but also to a mount board via the case 50, and a vibration can be prevented from traveling to a mount board, compared to conventional electronic devices.

In the ceramic capacitor 10, a contact state between the terminal contact portions 32 and 42 and the chip left and right end surfaces 20*a* and 20*b* can be maintained without using a solder or so, and it is thereby possible to prevent a joint release between the metal terminal portions 30 and 40 and the chip capacitors 20 due to heat during mounting. Moreover, the ceramic capacitor 10 can reduce an amount of materials with environmental load (such as lead) by avoiding using a high-temperature solder or so.

Since the metal terminal portions 30 and 40 have the lower exposed portions 37 and 47 exposed downward from the case 50 as shown in FIG. 2, when the ceramic capacitor 10 is mounted on a mount board, a solder fillet is formed between the lower exposed portions 37 and 47 and a land of the mount board, and the ceramic capacitor 10 thereby has a favorable mount strength. As shown in FIG. 7, a height from a mount surface to the lower end 50*aa* of the case left end wall 50*a* and the lower end 50*ba* of the case right end wall 50*b* can prevent a solder from excessively creeping up during mounting and can prevent an acoustic noise from deteriorating. Since the lower ends 50*aa* and 50*ba* of the case left end wall 50*a* and the case right end wall 50*b* are positioned above the outer surface of the case connection portion 50*f*, a part of the inner surfaces of the lower exposed portions 37 and 47 is in contact with the case inner walls 50*h* and 50*i* and the case connection portion 50*f*, an excessive solder is prevented from attaching to this part, and a shape of the fillet during mounting can be controlled effectively. Since the lower exposed portions 37 and 47 are positioned closer to the center of the ceramic capacitor 10 than the case left end wall 50*a* or the case right end wall 50*b* in the Y-axis direction, at least a part of the fillet formed on the lower exposed portions 37 and 47 is formed within a total length of the ceramic capacitor 10 in the Y-axis direction. Thus, an increase in mount area due to formation of a fillet in the ceramic capacitor 10 can be prevented, compared to conventional electronic devices where metal terminal portions are arranged on both ends.

The ceramic capacitor 10 according to an embodiment of the present invention is described using the figures, but the present invention is not limited to only the above-mentioned embodiment. The ceramic capacitor 10 has two chip capacitors, but for example, any number, such as three or more, of chip capacitors contained the ceramic capacitor may be employed.

As shown in FIG. 7, the lower exposed portions 37 and 47 and the mount portions 38 and 48 of the metal terminal portions 30 and 40 may be connected with the overlapped portions 36 and 46, or may be connected with the terminal contact portions 32 and 42. The case connection portion 50*f* may be in contact with the mount portion 48, or may be separated from the mount portion 48 with a predetermined space.

NUMERICAL REFERENCES

10 . . . ceramic capacitor
20 . . . chip capacitor
20*a* . . . chip left end surface
20*b* . . . chip right end surface
20*c* . . . chip front end surface
20*d* . . . chip back end surface
20*e* . . . chip top end surface
20*f* . . . chip bottom end surface
22, 24 . . . terminal electrode
30, 40 . . . metal terminal portion
31, 41 . . . terminal connection portion
32, 42 . . . terminal contact portion
34, 44 . . . bending portion
36, 46 . . . overlapped portion
37, 47 . . . lower exposed portion
38, 48 . . . mount portion
50 . . . case
50*a* . . . case left end wall
50*aa*, 50*ba* . . . lower end
50*b* . . . case right end wall
50*c* . . . case front side wall
50*d* . . . case back side wall
50*e* . . . cover portion
50*f* . . . case connection portion
50*g* . . . opening

The invention claimed is:

1. A ceramic electronic device comprising:
a chip component where terminal electrodes are formed on a pair of chip end surfaces;
a pair of metal terminal portions arranged correspondingly with the pair of chip end surfaces; and
a case composed of an insulator and housing at least a part of the chip component and the pair of metal terminal portions,
wherein each of the pair of metal terminal portions comprises:
a terminal connection portion facing one of the pair of chip end surfaces and connected with one of the terminal electrodes; and
a mount portion electrically connected with the terminal connection portion, extending toward a center substantially vertically to the one of the pair of chip end surfaces, and facing the chip component with a predetermined space,
wherein the terminal connection portion comprises:
a terminal contact portion being in contact with the one of the pair of chip end surfaces; and
an overlapped portion that is spaced from and overlaps the terminal contact portion and is connected with the terminal contact portion via a bending portion,
wherein the case comprises:
a pair of case end walls facing the pair of chip end surfaces across the terminal connection portion;
a pair of case side walls connecting the pair of case end walls and facing each other across the chip component;
a pair of case inner walls connecting the pair of case side walls at the inner side of the pair of case end walls, and
a case connection portion connecting the pair of case side walls below the chip component, connecting the pair of case inner walls, but not connected to the pair of case end walls, and
wherein the overlapped portion is sandwiched between one of the pair of case end walls and one of the pair of case inner walls, the pair of case end walls sandwiches the pair of metal terminal portions from both sides, and holds the chip component between the pair of metal terminal portions.

2. The ceramic electronic device according to claim 1, wherein
the overlapped portion is at least partially sandwiched with the terminal contact portion between the one of the pair of chip end surfaces and the one of the pair of case end walls.

3. The ceramic electronic device according to claim 1, wherein the each of the pair of metal terminal portions comprises a lower exposed portion extending substantially in parallel to the one of the pair of chip end surfaces, exposed downward from a lower end of the pair of case end walls, and connecting between the terminal connection portion and the mount portion.

4. The ceramic electronic device according to claim 1, comprising:
a plurality of the chip components arranged in a parallel direction to a mount surface; and
a plurality of the metal terminal portions corresponding with each of the chip components,
wherein the pair of case end walls sandwiches the plurality of the metal terminal portions from both sides and holds the plurality of the chip components between the plurality of the metal terminal portions.

5. The ceramic electronic device according to claim 1, wherein the case comprises a cover portion connecting the pair of case side walls above the chip component.

6. A ceramic electronic device comprising:
a chip component having a pair of opposing chip end surfaces and a terminal electrode formed on each of the pair of opposing chip end surfaces;
a pair of metal terminal portions, a first metal terminal portion of the pair of metal terminal portions positioned at a first chip end surface of the pair of opposing chip end surfaces and a second metal terminal portion of the pair of metal terminal portions positioned at a second chip end surface of the pair of opposing chip end surfaces; and
a case composed of an insulator and housing at least a part of the chip component and the pair of metal terminal portions, wherein:
each of the metal terminal portions comprises:
a terminal connection portion facing one of the pair of opposing chip end surfaces and connected with one of the terminal electrodes; and
a mount portion (1) electrically connected with the terminal connection portion and (2) extending below and spaced from the chip component;
the terminal connection portion comprises:
a terminal contact portion in contact with one of the pair of opposing chip end surfaces; and
an overlapped portion that is spaced from and overlaps the terminal contact portion and is connected with the terminal contact portion via a bending portion;
the case comprises:
a pair of case end walls located exterior to and facing the pair of opposing chip end surfaces;
a pair of case side walls connecting the pair of case end walls with the chip component located between the pair of case side walls;

a pair of case inner walls (1) connecting the pair of case side walls and (2) spaced inwardly from the pair of case end walls; and a case connection portion connecting the pair of case side walls below the chip component, connecting the pair of case inner walls, but not connected to the pair of case end walls;

the overlapped portion is sandwiched between one of the pair of case end walls and one of the pair of case inner walls; and the pair of metal terminal portions is positioned between the pair of case end walls such that the chip component is held between the pair of metal terminal portions.

\* \* \* \* \*